United States Patent
Kamada et al.

(10) Patent No.: US 8,511,643 B2
(45) Date of Patent: Aug. 20, 2013

(54) DIAPHRAGM, DIAPHRAGM VALVE, AND METHOD OF MANUFACTURING DIAPHRAGM

(75) Inventors: Takashi Kamada, Chiba (JP); Kyotaro Takahashi, Chiba (JP)

(73) Assignee: Seiko Instruments Inc., Chiba-Shi, Chiba (JP)

( * ) Notice: Subject to any disclaimer, the term of this patent is extended or adjusted under 35 U.S.C. 154(b) by 298 days.

(21) Appl. No.: 13/051,668

(22) Filed: Mar. 18, 2011

(65) Prior Publication Data

US 2011/0233443 A1    Sep. 29, 2011

(30) Foreign Application Priority Data

Mar. 24, 2010   (JP) .................................. 2010-067974

(51) Int. Cl.
*F16K 1/00*    (2006.01)

(52) U.S. Cl.
USPC ........... 251/331; 251/332; 251/358; 251/368; 251/335.2

(58) Field of Classification Search
USPC .................. 251/331, 332, 358, 368, 61–61.5, 251/335.2; 92/103 R, 103 M
See application file for complete search history.

(56) References Cited

U.S. PATENT DOCUMENTS

| | | | | |
|---|---|---|---|---|
| 2,324,880 A | * | 7/1943 | Rogers et al. | 251/331 |
| 5,865,417 A | * | 2/1999 | Harris et al. | 251/11 |
| 6,407,481 B1 | * | 6/2002 | Takeuchi et al. | 310/324 |
| 6,411,011 B1 | * | 6/2002 | Takeuchi et al. | 310/324 |
| 8,256,744 B2 | | 9/2012 | Tanikawa et al. | |
| 2003/0011283 A1 | * | 1/2003 | Takeuchi et al. | 310/328 |
| 2006/0081807 A1 | * | 4/2006 | Browne et al. | 251/331 |
| 2008/0194976 A1 | * | 8/2008 | Lia et al. | 600/490 |
| 2008/0289956 A1 | * | 11/2008 | Schussler | 204/296 |
| 2008/0302323 A1 | * | 12/2008 | Kern et al. | 123/145 A |

FOREIGN PATENT DOCUMENTS

| | | |
|---|---|---|
| JP | 04-080342 A | 3/1992 |
| JP | 7317926 A * | 12/1995 |
| JP | 08-004918 A | 1/1996 |
| JP | 2007-064333 A | 3/2007 |

OTHER PUBLICATIONS

English Language Abstract for JP7317926(A) from EPO website, Mar. 4, 2013.*

* cited by examiner

*Primary Examiner* — John K Fristoe, Jr.
*Assistant Examiner* — Jessica Cahill
(74) *Attorney, Agent, or Firm* — Brinks Hofer Gilson & Lione

(57) ABSTRACT

Provided are a diaphragm, a diaphragm valve, and a method of manufacturing a diaphragm capable of increasing a flow rate (Cv value) of gas without degrading long-term durability even when a displacement amount is increased. A diaphragm (1) has an outer diameter Φ of 10 to 35 mm and includes a dome portion (1D) in a dome shape and a flange portion (1T) formed continuously at a peripheral edge of the dome portion (1D) via a boundary portion (1K), the boundary portion (1K) has a radius of curvature R of 0.6 mm or more on a convex side of the dome portion (1D), and the diaphragm is formed of a cobalt-based super-alloy.

11 Claims, 5 Drawing Sheets

DIAPHRAGM, DIAPHRAGM VALVE, AND METHOD OF MANUFACTURING DIAPHRAGM

RELATED APPLICATIONS

This application claims priority under 35 U.S.C. §119 to Japanese Patent Application No. 2010-067974 filed on Mar. 24, 2010, the entire content of which is hereby incorporated by reference.

BACKGROUND OF THE INVENTION

1. Field of the Invention

The present invention relates to a diaphragm, a diaphragm valve, and a method of manufacturing a diaphragm.

2. Description of the Related Art

In a semiconductor manufacturing gas process or the like in which highly corrosive gas is used, a diaphragm valve that functions as an open/close valve for the corrosive gas is required to have high corrosion resistance. Therefore, conventionally, as a diaphragm of high performance used in a semiconductor manufacturing gas process or the like, a metal diaphragm made of a superalloy of a cobalt group, a nickel group, etc. is used.

Further, a diaphragm valve used for the above-mentioned application is required to have strength that enables baking in a low to high temperature range and withstands a low pressure to a high pressure exceeding 150 kg/cm$^2$. Further, because the metal diaphragm is used repeatedly at a high frequency as an open/close valve for corrosive gas, the metal diaphragm is required to have durability under such a severe use environment.

In order to satisfy such requirements, a metal diaphragm or diaphragm valve excellent in characteristics such as corrosion resistance and durability has been developed actively (see, for example, Japanese Patent Application Laid-open No. 08-4918).

In recent years, along with the enlargement of a system along with the enlargement of a silicon wafer, a liquid crystal panel, etc. and the streamlining of a semiconductor manufacturing facility, there is a tendency that a flow rate (CV value) of gas flowing through the diaphragm valve is increased. The diaphragm valve opens/closes a valve set in a flow path of gas by deforming a swelling portion of a dome-shaped metal diaphragm, to thereby function as an open/close valve for gas. Therefore, in order to increase a flow rate (Cv value) of gas, it is necessary to increase a displacement amount (deformation amount) of the metal diaphragm at the time of open/close of the valve and to increase the amount of gas flowing through the diaphragm valve.

However, when the displacement amount of the metal diaphragm is increased, the stress applied to the metal diaphragm is increased, which reduces the durability of the diaphragm valve. Therefore, it has been difficult to increase the displacement amount of the metal diaphragm while maintaining durability.

SUMMARY OF THE INVENTION

The present invention has been made in view of such conventional circumstances, and has an object to provide a diaphragm, a diaphragm valve, and a method of manufacturing a diaphragm capable of increasing a flow rate (Cv value) of gas without degrading long-term durability even when a displacement amount is increased.

In order to achieve the above-mentioned object, the present invention is configured as follows.

A diaphragm according to the present invention has an outer diameter $\Phi$ of 10 to 35 mm and includes a dome portion in a dome shape and a flange portion formed continuously at a peripheral edge of the dome portion via a boundary portion, the boundary portion has a radius of curvature R of 0.6 mm or more on a convex side of the dome portion, and the diaphragm is formed of a cobalt-based superalloy having a composition range of 30 to 45% of cobalt, 10 to 20% of nickel, 5 to 20% of chromium, 3 to 5% of tungsten, 3 to 9% of molybdenum, and 1 to 40% of iron in terms of mass ratio, and inevitable impurities.

Further, a diaphragm according to the present invention has an outer diameter $\Phi$ of 10 to 35 mm and includes a dome portion in a dome shape and a flange portion formed continuously at a peripheral edge of the dome portion via a boundary portion, the boundary portion has a radius of curvature R of 0.6 mm or more on a convex side of the dome portion, and the diaphragm is formed of a nickel-based superalloy having a composition range of 25 to 45% of cobalt, 12 to 25% of chromium, 8 to 15% of molybdenum, 0.1 to 3% of niobium, and 12 to 54.9% of nickel in terms of mass ratio, and inevitable impurities.

In the diaphragm according to the present invention, it is preferred that the outer diameter $\Phi$ and the radius of curvature R satisfy a relationship of $R \geq 136.97\Phi^{-1.5383}$.

A method of manufacturing a diaphragm according to the present invention, the diaphragm having an outer diameter $\Phi$ of 10 to 35 mm and including a dome portion in a dome shape and a flange portion formed continuously at a peripheral edge of the dome portion via a boundary portion, the boundary portion having a radius of curvature R of 0.6 mm or more on a convex side of the dome portion, includes die-cutting to a disk shape and then molding in a dome shape a cobalt-based superalloy having a composition range of 30 to 45% of cobalt, 10 to 20% of nickel, 5 to 20% of chromium, 3 to 5% of tungsten, 3 to 9% of molybdenum, and 1 to 40% of iron in terms of mass ratio, and inevitable impurities.

In the method of manufacturing a diaphragm according to the present invention, it is preferred that the outer diameter $\Phi$ and the radius of curvature R satisfy a relationship of $R \geq 136.97\Phi^{-1.5383}$.

A method of manufacturing a diaphragm according to the present invention, the diaphragm having an outer diameter $\Phi$ of 10 to 35 mm and including a dome portion in a dome shape and a flange portion formed continuously at a peripheral edge of the dome portion via a boundary portion, the boundary portion having a radius of curvature R of 0.6 mm or more on a convex side of the dome portion, includes die-cutting to a disk shape and then molding in a dome shape a nickel-based superalloy having a composition range of 25 to 45% of cobalt, 12 to 25% of chromium, 8 to 15% of molybdenum, 0.1 to 3% of niobium, and 12 to 54.9% of nickel in terms of mass ratio, and inevitable impurities.

In the method of manufacturing a diaphragm according to the present invention, it is preferred that the outer diameter $\Phi$ and the radius of curvature R satisfy a relationship of $R \geq 136.97\Phi^{-1.5383}$.

A diaphragm valve according to the present invention includes any of the above-mentioned diaphragms.

The diaphragm of the present invention can effectively reduce the stress applied to the diaphragm by setting the radius of curvature R of the boundary portion positioned at the border between the dome portion and the flange portion in a predetermined range on the convex side of the dome portion. Thus, even in the case of increasing the Cv value by increasing the displacement amount of the diaphragm, high long-term durability can be obtained. Further, the diaphragm of the present invention is formed of the cobalt-based superalloy or nickel-based superalloy with a predetermined composition, and thus, the diaphragm can have high hardness and tensile strength, long life even used under a high pressure, and high corrosion resistance which enables the diaphragm to be used even for corrosive gas.

The diaphragm valve of the present invention includes the diaphragm of the present invention having the above-mentioned excellent characteristics, and hence has high strength, corrosion resistance, and long-term durability.

Further, according to the method of manufacturing a diaphragm of the present invention, the diaphragm having high strength, corrosion resistance, and long-term durability can be provided.

BRIEF DESCRIPTION OF THE DRAWINGS

In the accompanying drawings:

FIGS. 3A to 3C are views illustrating a method of measuring a displacement amount and a repulsion force of the diaphragm in an example, of which FIG. 3A is a cross-sectional view of the diaphragm in an initial state, FIG. 3B is a cross-sectional view of the diaphragm at a time of measurement of the repulsion force, and FIG. 3C is a partial cross-sectional view of a measurement device of the displacement amount and the repulsion force of the diaphragm;

DETAILED DESCRIPTION OF THE PREFERRED EMBODIMENT

First, a diaphragm and a diaphragm valve of the present invention are described with reference to FIGS. 1 and 2.

Figure 1:
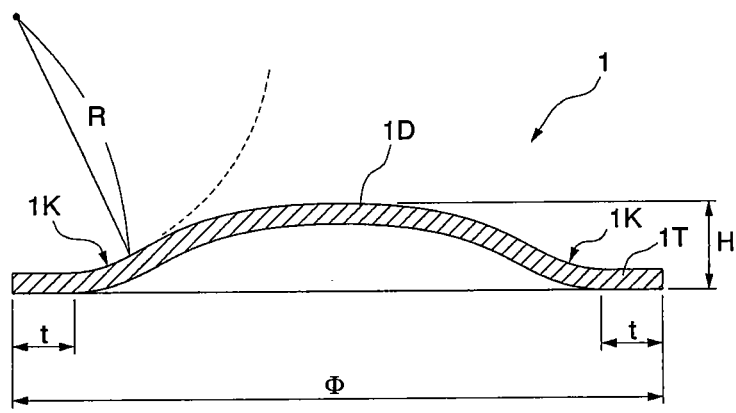
FIG. 1 is a schematic cross-sectional view illustrating an example of a diaphragm of the present invention.

FIG. 1 is a schematic cross-sectional view illustrating one embodiment of the diaphragm according to the present invention. FIG. 2 is a schematic cross-sectional view illustrating one embodiment of the diaphragm valve according to the present invention. In FIG. 2, only main portions in the vicinity of the diaphragm are illustrated, and the other components are omitted for simplicity of the description.

Figure 2:
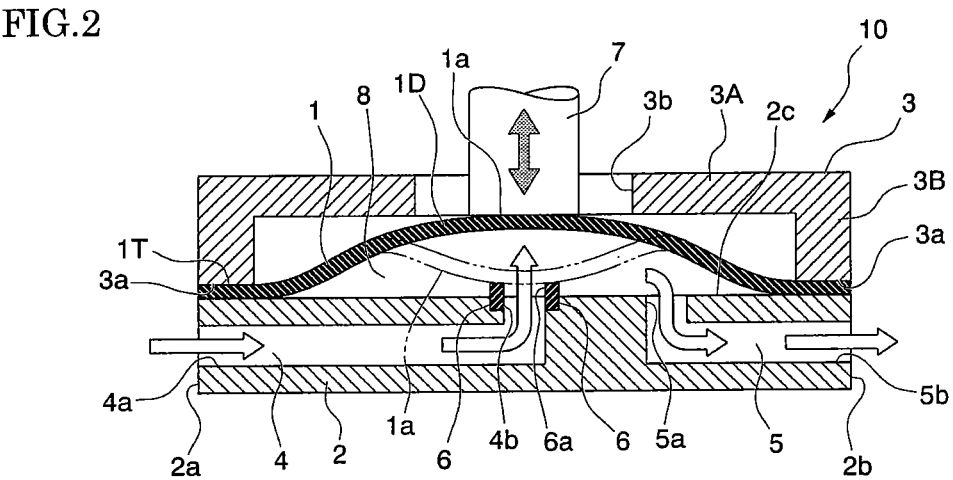
FIG. 2 is a schematic cross-sectional view illustrating an example of a diaphragm valve of the present invention.

As illustrated in FIG. 2, a diaphragm valve 10 of this embodiment includes a main body 2 in which a first flow path 4 and a second flow path 5 are formed and a diaphragm 1 placed with a peripheral edge portion thereof fixed on the main body 2 by a cover 3. In the main body 2, the first flow path 4 is formed so as to extend from one side surface 2a of the main body 2 to a center portion of an upper surface 2c of the main body 2. In the side surface 2a of the main body 2, an inflow port 4a of the first flow path 4 is formed, and an outflow port 4b of the first flow path 4 is formed in the center portion of the upper surface 2c of the main body 2. On a side opposite to the side where the first flow path 4 is formed in the main body 2, the second flow path 5 is formed so as to extend from a position slightly away from the outflow port 4b of the first flow path 4 to another side surface 2b of the main body 2. An inflow port 5a of the second flow path 5 is formed in the upper surface 2c of the main body 2, and an outflow port 5b of the second flow path 5 is formed in the side surface 2b of the main body 2. A valve seat ring 6 is provided at the outflow port 4b of the first flow path 4 so as to protrude from the upper surface 2c of the main body 2, and a circulation port 6a formed of an upper end portion of the valve seat ring 6 is opposed to a center portion 1a of the diaphragm 1. The main body 2 and the cover 3 are formed of metal, an alloy, etc. having corrosion resistance under SUS316L of Japanese Industrial Standards.

The diaphragm 1 includes a dome portion 1D in a partially spherical shell shape (dome shape) having a large radius of curvature with a center portion thereof swelling toward an upper portion side, and a flange portion 1T formed continuously at a peripheral edge of the dome portion 1D via a boundary portion 1K. The diaphragm 1 is placed so that a concave side of the dome portion 1D is opposed to the valve seat ring 6, and is fixed by the cover 3 set over the diaphragm 1. The diaphragm 1 is placed in an upper portion of the main body 2 by sandwiching the flange portion 1T provided in the peripheral edge portion of the diaphragm 1 between the upper surface 2c of the main body 2 and a holding surface 3c in a lower portion of a circumferential wall of the cover 3 in a tubular shape having a ceiling portion 3A and a circumferential wall 3B.

A through-hole 3b through which a stem 7 passes is provided in a center portion of the ceiling portion 3A of the cover 3. A lowest end surface of the stem 7 makes surface contact with the upper surface of the diaphragm 1, and an upper portion of the stem 7 is provided with stem raise or lower means (not shown) such as a handle capable of moving the stem 7 to raise or lower. The stem 7 is formed of metal, an alloy, etc. under SUS316L of Japanese Industrial Standards.

In the case of obtaining a closed valve state of the diaphragm valve 10, the stem 7 is lowered by the stem raise or lower means such as a handle. Then, the stem 7 is lowered to press the center portion 1a of the diaphragm 1 downward. Thus, the diaphragm 1 is deformed elastically into a state as represented by a broken line of FIG. 2, and rests on the valve seat ring 6 to close the circulation port 6a, resulting in a closed valve state. Further, in the case of obtaining an open valve state of the diaphragm valve 10, the stem 7 is raised by the stem raise or lower means. Then, the diaphragm 1 is restored to an original shape due to its elastic force and a fluid pressure, and lifts from the valve seat ring 6 to open the circulation port 6a, resulting in an open valve state. In the open valve state of the diaphragm valve 10, the fluid guided into the first flow path 4 through the inflow port 4a passes through the circulation port 6a to be guided into a fluid chamber 8 formed by the main body 2 and the diaphragm 1, and further flows through the second flow path 5 from the inflow port 5a to the outflow port 5b. In the closed valve state of the diaphragm valve 10, the diaphragm 1 comes into contact with the valve seat ring 6 to close the circulation port 6a of the fluid.

Thus, the diaphragm valve 10 is opened/closed based on whether or not the diaphragm 1 is pressed with the stem 7 to be deformed. The diaphragm 1 of the present invention has characteristics in which long-term durability is not degraded even when the displacement amount of the diaphragm 1 is increased so as to increase a flow rate (Cv value) of the fluid. Hereinafter, the diaphragm 1 of the present invention is described in detail with reference to FIG. 1.

The diaphragm 1 of the present invention includes the dome portion 1D in a dome shape and the flange portion 1T formed continuously at the peripheral edge of the dome portion 1D via the boundary portion 1K.

The diaphragm 1 is formed of a cobalt-based superalloy having a composition range of 30 to 45% of cobalt, 10 to 20% of nickel, 5 to 20% of chromium, 3 to 5% of tungsten, 3 to 9% of molybdenum, and 1 to 40% of iron in terms of mass ratio, and inevitable impurities, or a nickel-based superalloy having a composition range of 25 to 45% of cobalt, 12 to 25% of chromium, 8 to 15% of molybdenum, 0.1 to 3% of niobium, and 12 to 54.9% of nickel in terms of mass ratio, and inevitable impurities. Hereinafter, the reasons for defining these composition ranges are described.

Cobalt (Co) has an effect of reducing cut-away fragility and enhancing fatigue strength due to its large work hardening properties. However, when the content of cobalt is less than the lower limit value, the effect of enhancing fatigue strength is weak. When the content of cobalt exceeds the upper limit value, a matrix becomes too hard to make it difficult to process, and there is a possibility that a face-centered cubic lattice may become unstable with respect to a hexagonal close-packed lattice phase. Therefore, the content of cobalt of the cobalt-based superalloy was set to be 30 to 45% by mass and the content of cobalt of the nickel-based superalloy was set to be 25 to 45% by mass.

Chromium (Cr) is a component indispensable for ensuring corrosion resistance and has an effect of strengthening a matrix. However, when the content of chromium is less than the lower limit value, the effect of obtaining excellent corrosion resistance is weak, and when the content of chromium exceeds the upper limit value, there is a possibility that a σ phase is precipitated to decrease processability and toughness rapidly. Therefore, the content of chromium of the cobalt-based superalloy was set to be 5 to 20% by mass, and the content of chromium of the nickel-based superalloy was set to be 12 to 25% by mass.

Nickel (Ni) has an effect of stabilizing a face-centered cubic lattice phase, maintaining processability, and enhancing corrosion resistance. However, when the content of nickel is less than the lower limit value, it is difficult to obtain a stable face-centered cubic lattice. When the content of nickel exceeds the upper limit value, there is a possibility that mechanical strength may be decreased. Therefore, the content of nickel of the cobalt-based superalloy was set to be 10 to 20% by mass and the content of nickel of the nickel-based superalloy was set to be 12 to 54.9% by mass.

Molybdenum (Mo) has an effect of forming a solid solution in a matrix to strengthen the matrix, enhancing work hardening properties, and enhancing corrosion resistance in the coexistence with Cr. However, when the content of molybdenum is less than the lower limit value, the effect of enhancing work hardening properties and enhancing corrosion resistance is weak, and when the content of molybdenum exceeds the upper limit value, there is a possibility that a σ phase is precipitated to decrease processability and toughness rapidly. Therefore, the content of molybdenum of the cobalt-based superalloy was set to be 3 to 9% by mass and the content of molybdenum of the nickel-based superalloy was set to be 8 to 15% by mass.

In the cobalt-based superalloy, tungsten (W) has a remarkable effect of forming a solid solution in a matrix to strengthen the matrix and enhancing work hardening properties. However, when the content of tungsten is less than 3% by mass, the effect of enhancing work hardening properties is weak, and when the content of tungsten exceeds 5% by mass, there is a possibility that a σ phase is precipitated to decrease toughness. Therefore, the content of tungsten of the cobalt-based superalloy was set to be 3 to 5% by mass.

In the cobalt-based superalloy, iron (Fe) has an effect of forming a solid solution in a matrix to strengthen the matrix. However, when the content of iron is too large, oxidation resistance is degraded. Therefore, the content of iron was set to be 1 to 40% by mass.

In the nickel-based superalloy, niobium (Nb) has an effect of forming a solid solution in a matrix to strengthen the matrix and enhancing work hardening properties. When the content of niobium is less than 0.1% by mass, the effect of enhancing work hardening properties is weak, and when the content of niobium exceeds 3% by mass, there is a possibility that a σ phase and a δ phase ($Ni_3Nb$) are precipitated to decrease toughness. Therefore, the content of niobium of the nickel-based superalloy was set to be 0.1 to 3% by mass.

The nickel-based superalloy forming the diaphragm 1 of the present invention may contain trace amounts of elements such as 0.03% by mass or less of carbon (C), 0.5% by mass or less of manganese (Mn), 0.1 to 0.8% by mass of titanium (Ti), 0.1% by mass or less of silicon (Si), and 1.1 to 2.1% by mass of iron (Fe), and inevitable impurities, in addition to the above-mentioned elements. In the case where the above-mentioned nickel-based superalloy contains these trace amounts of elements and inevitable impurities, a part of nickel (Ni) can be replaced therewith.

The cobalt-based superalloy forming the diaphragm 1 of the present invention may contain trace amounts of elements such as 0.03% by mass or less of carbon (C), 0.04 to 0.12% by mass of aluminum (Al), 0.8 to 1.05% by mass of silicon (Si), 0.5 to 1.10% by mass of manganese (Mn), and 0.1 to 0.8% by mass of titanium (Ti), and inevitable impurities, in addition to the above-mentioned elements. In the case where the above-mentioned cobalt-based superalloy contains these trace amounts of elements and inevitable impurities, a part of iron (Fe) can be replaced therewith.

Of the trace amounts of elements, titanium (Ti) has an effect of strong deoxidation, denitrification, and desulphurization, and an effect of refining an ingot structure. When the content of titanium is less than the lower limit value, the effect obtained by adding titanium is unlikely to be expressed, and when the content of titanium is too large, there is a possibility that an η phase ($Ni_3Ti$) is precipitated to decrease toughness. Therefore, in the case where the cobalt-based superalloy contains Ti, the content thereof is preferably set to be 0.1 to 0.8% by mass. In the case where the nickel-based superalloy contains Ti, the content thereof is preferably set to be 0.1 to 0.8% by mass.

Of the trace amount of elements, manganese (Mn) has an effect of deoxidation and desulphurization, and an effect of stabilizing a face-centered cubic lattice phase. However, when the content of manganese is too large, there is a possibility that toughness may be decreased. Therefore, in the case where the cobalt-based superalloy contains Mn, the content thereof is preferably set to be 0.5 to 1.10% by mass, and in the case where the nickel-based superalloy contains Mn, the content thereof is preferably set to be 0.5% by mass or less.

Of the trace amount of elements, carbon (C) has an effect of forming a solid solution in a matrix, forming a carbide with Cr, Mo, Nb, W, etc., and preventing crystal grains from being coarsened. However, when the content of carbon is too large, there is a possibility that toughness may be decreased, corrosion resistance may be degraded, etc. Therefore, in the case where the cobalt-based superalloy or the nickel-based superalloy contains C, the content thereof is preferably set to be 0.03% by mass or less.

Of the trace amount of elements, iron (Fe) has an effect of forming a solid solution in a matrix to strengthen the matrix. However, when the content of iron is too large, oxidation resistance is degraded. Therefore, in the case where the nickel-based superalloy contains Fe, the content thereof is preferably set to be 1.1 to 2.1% by mass.

By forming the diaphragm 1 of the cobalt-based superalloy or the nickel-based superalloy with such a composition, the diaphragm 1 and the diaphragm valve 10 have high hardness and tensile strength, have long life even when used under a high pressure of 150 kg/cm$^2$ or more, and exhibit high corrosion resistance which allows the diaphragm 1 and the diaphragm valve 10 to be used also for corrosive gas.

In the present invention, an outer diameter $\Phi$ of the diaphragm 1 can be set to be 10 to 35 mm, a height H thereof can be set to be 0.4 to 1.4 mm, a width t of the flange portion 1T can be set to be 0.4 to 1.5 mm, and a thickness of the diaphragm 1 can be set to be 0.1 to 0.25 mm, approximately. However, these dimensions can be changed appropriately depending upon the outer diameter $\Phi$, the diameter of the dome portion 1D, etc.

A radius of curvature R of the boundary portion 1K on the convex side of the dome portion 1D of the diaphragm 1 is 0.6 mm or more. By setting the radius of curvature R of the boundary portion 1K to be 0.6 mm or more, a stress applied to the diaphragm 1 when the diaphragm 1 is deformed by the stem 7 can be reduced as shown in examples described later, and hence, the long-term durability can be enhanced.

The radius of curvature R (mm) of the boundary portion 1K is preferably set so as to satisfy a relationship of $R \geq 136.97\Phi^{-1.5383}$ with respect to the outer diameter $\Phi$ (mm). By setting the radius of curvature R of the boundary portion 1K so as to satisfy this relationship, a stress applied to the diaphragm 1 when the diaphragm 1 is deformed can be reduced effectively, and even when a Cv value is increased by increasing the displacement amount of the diaphragm 1, the diaphragm 1 with high long-term durability can be obtained.

Further, in the present invention, it is further preferred to set the radius of curvature R of the boundary portion 1K so that the radius of curvature R (mm) of the boundary portion 1K and the outer diameter $\Phi$ (mm) satisfy a relationship of $R \geq 194.63\Phi^{-1.3807}$. As the radius of curvature R of the boundary portion 1K increases, a stress applied to the diaphragm 1 can be further reduced. It is particularly preferred to set the radius of curvature R so as to satisfy a relationship of $R \geq 194.63\Phi^{-1.3807}$, because a high stress reducing effect can be exhibited irrespective of the displacement amount of the diaphragm 1.

Although the upper limit value of the radius of curvature R is not particularly limited, if the radius of curvature R is set to be too large in the case where the outer diameter $\Phi$ of the diaphragm 1 is, for example, about 10 mm, the flange portion 1T and the boundary portion 1K cannot be discriminated from each other, which may make it difficult to handle the diaphragm 1 in the course of manufacturing and inspection. Therefore, in the diaphragm 1 of the present invention with the outer diameter $\Phi$ of 10 to 35 mm, as shown in the examples described later, a high stress reducing effect can be exhibited irrespective of the size of the outer diameter $\Phi$ by setting the upper limit of the radius of curvature R to be about 8.1.

By setting the radius of curvature R of the boundary portion 1K so as to satisfy such a relationship, a stress applied to the diaphragm 1 can be reduced effectively. Therefore, even in the case where a Cv value is set to be large, the diaphragm 1 and the diaphragm valve 10 with high long-term durability can be obtained.

Next, a method of manufacturing the diaphragm 1 is described.

First, a bar with a thickness of 0.1 to 0.3 mm, which is obtained by ultra-cleaning the cobalt-based superalloy or the nickel-based superalloy formed of the above-mentioned composition by vacuum melting with a cold working ratio being set to 40 to 90%, is die-cut to a disk shape by punching. Then, the die-cut disk is molded in a dome shape, and thus, a diaphragm 1 in a desired shape can be manufactured. Before or after the die-cut disk is molded in a dome shape, the disk may be subjected to surface polishing. Further, after molding, the disk may be subjected to vacuum heat treatment at a temperature of 300 to 700° C. Due to such heat treatment, the mechanical strength of the diaphragm 1 can be enhanced.

The diaphragm 1 of the present invention is formed of an alloy with the above-mentioned predetermined composition, and hence, the diaphragm 1 has high hardness and tensile strength, has long life even when used under a high pressure of 150 kg/cm$^2$ or more, and exhibits high corrosion resistance which allows the diaphragm 1 to be used also for corrosive gas.

Further, in the diaphragm 1 of the present invention, by setting the outer diameter $\Phi$ and the radius of curvature R of the boundary portion 1K, a stress applied to the diaphragm 1 when the diaphragm 1 is pressed down by the stem 7 to be deformed can be reduced. Thus, the diaphragm 1 of the present invention can have long-term durability even in the case where a Cv value is set to be large by increasing the displacement amount.

The diaphragm valve 10 of the present invention is provided with the diaphragm 1 of the present invention having excellent characteristics as described above, and hence, the diaphragm valve 10 having high strength, corrosion resistance, and long-term durability can be obtained.

Further, according to the method of manufacturing a diaphragm of the present invention, the diaphragm 1 having high strength, corrosion resistance, and long-term durability can be provided.

One embodiment of the pressure sensor, the diaphragm, and the method of manufacturing a diaphragm according to the present invention has been described above. Each part constituting the pressure sensor 10 and the diaphragm 1 is an example, and can be changed appropriately without departing from the scope of the present invention.

EXAMPLES

Hereinafter, examples of the present invention are described, but the present invention is not limited to these examples.

Example 1

An alloy having a composition of Cr:20.11%, Ni:32.07%, Mo:10.02%, Fe:1.9%, Nb:0.91%, Mn:0.2%, Ti:0.49%, C:0.014%, and Si:0.04% in terms of mass ratio, with the remaining part being formed of Co and inevitable impurities, was ultra-cleaned by vacuum melting, and the resultant alloy was subjected to cold working with a working ratio of 80% to manufacture a bar with a thickness of 0.1 mm. After the bar was die-cut to a disk shape by punching, the bar was molded in a dome shape. Thus, a plurality of diaphragms in a shape illustrated in FIG. 1 having an outer diameter Φ of 20 mm, a thickness of 0.1 mm, a height H of 0.75 mm, and a width t of a flange portion of 1 mm were manufactured with R being set to respective values of 0.6 mm, 1.2 mm, 2.5 mm, 4.0 mm, and 5.7 mm.

Figure 3A:
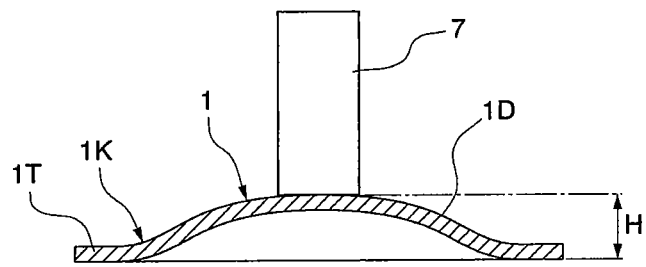
Figure 3B:
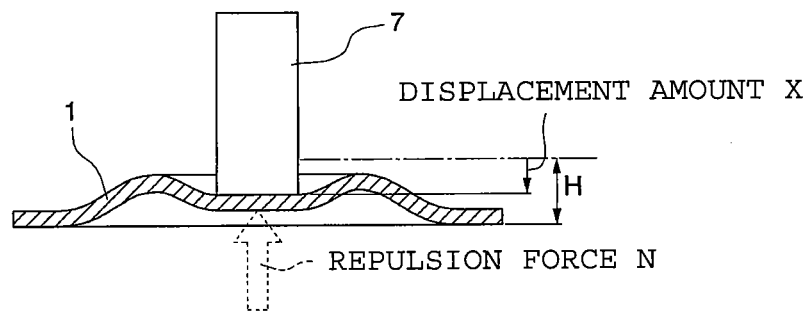
Figure 3C:
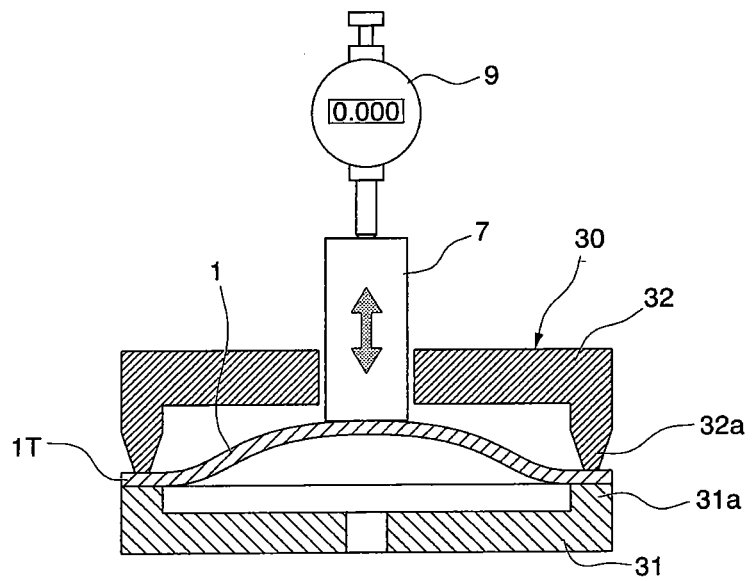
Figure 4A:
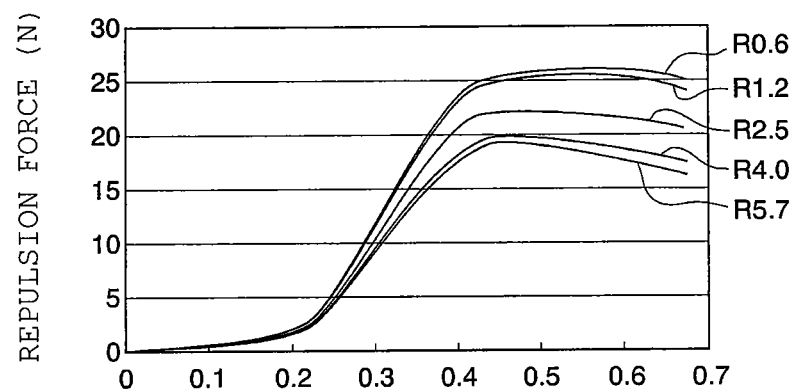
FIG. 4A is a graph illustrating a relationship between a displacement amount and a repulsion force in a diaphragm having an outer diameter of 20 mm.

A relationship of a repulsion force with respect to a displacement amount that is a deformation degree of the diaphragm was measured on each manufactured diaphragm. A measurement method is described with reference to FIGS. 3A to 3C. FIG. 3A is a cross-sectional view of the diaphragm 1 in a measurement initial state, and in the initial state, a metal bar in a cylindrical shape with an outer diameter of 8 mm is set as the stem 7 so as to contact the upper surface of the diaphragm 1 with an outer diameter Φ of 20 mm. FIG. 3B is a cross-sectional view of the diaphragm 1 at a time of measurement of the repulsion force, and the diaphragm 1 pressed by the stem 7 is deformed by a displacement amount X. As illustrated in FIG. 3B, the repulsion force occurs in a direction opposite to the pressing direction of the stem 7 in the diaphragm 1 deformed by the pressing of the stem 7. The repulsion force was measured by setting the diaphragm 1 at a measurement device 30 illustrated in FIG. 3C. The measurement device 30 includes a disk-shaped base 31 and a cover 32 placed over the base 31, and can sandwich the diaphragm 1 between an outer circumferential portion 31a of the base 31 and an outer circumferential portion 32a of the cover 32. A plurality of the measurement devices 30 were prepared and used for measurement in accordance with the outer diameter of the diaphragm 1 to be measured. The measurement device 30 fixes the flange portion 1T of the diaphragm 1 by sandwiching the flange portion 1T between the base 31 and the cover 32, and has a load cell 9 placed on the stem 7 in the upper portion of the diaphragm 1. The measurement device 30 can measure a load by using the load cell 9, and simultaneously measure a displacement amount. FIG. 4A illustrates results obtained by measuring the relationship between the displacement amount and the repulsion force in each diaphragm.

As illustrated in FIG. 4A, as the radius of curvature R of the boundary portion 1K was increased, the repulsion force applied to the diaphragm became smaller. Because the repulsion force can be considered as a stress applied to the diaphragm, it is understood from the results that a stress applied to the diaphragm can be reduced by enlarging the radius of curvature R of the boundary portion 1K.

Further, as a support for the results, each diaphragm having an outer diameter Φ of 20 mm manufactured in the above was placed at a diaphragm valve as illustrated in FIG. 2, the diaphragm valve was opened/closed repeatedly with a displacement amount of the diaphragm being 0.3 to 0.6 mm, and thus, a durability test of each diaphragm valve and each diaphragm was conducted. Table 1 shows the results. In Table 1, regarding data noted as ">2,000,000 times", the measurement was terminated at a time of exceeding 2,000,000 times, no open/close operation abnormality was found after the operation of 2,000,000 times, and no symptom of fatigue breakdown such as a crack was found in the diaphragm.

TABLE 1

| Radius of curvature R (mm) | Displacement amount (mm) | | | |
|---|---|---|---|---|
| | 0.3 | 0.4 | 0.5 | 0.6 |
| 0.6 | >2,000,000 times | >2,000,000 times | 650,000 to 850,000 times | 500,000 to 700,000 times |
| 1.2 | >2,000,000 times | >2,000,000 times | 650,000 to 850,000 times | 500,000 to 700,000 times |
| 2.5 | >2,000,000 times | >2,000,000 times | >2,000,000 times | >2,000,000 times |
| 4.0 | >2,000,000 times | >2,000,000 times | >2,000,000 times | >2,000,000 times |
| 5.7 | >2,000,000 times | >2,000,000 times | >2,000,000 times | >2,000,000 times |

From the results in Table 1, as the radius of curvature R is smaller, the number of times of durability decreases with an increase in displacement amount. As illustrated in FIG. 4A, the repulsion force (stress) of each diaphragm reaches a maximum value in the vicinity of a displacement amount of 0.4 mm. However, the diaphragm having the radius of curvature R of 0.6 mm or more according to the present invention exhibited long-term durability which allowed the diaphragm to withstand the use of 2,000,000 times or more with a displacement amount of 0.4 mm.

Further, a plurality of diaphragms were manufactured in the same way as in Example 1, except for using an alloy having a composition of Co:38.8%, Ni:16.5%, Cr:12.0%, W:4.07%, Mo:4.03%, Si:0.9%, Mn:0.69%, Ti:0.64%, Al:0.11%, and C:0.002% in terms of mass ratio, with the remaining portion being formed of Fe and inevitable impurities, and a durability test of each diaphragm valve and each diaphragm was conducted. As a result, the results similar to those in Table 1 were obtained, and the diaphragm having a radius of curvature R of 0.6 mm or more according to the present invention formed of a cobalt-based superalloy exhibited long-term durability which allowed the diaphragm to withstand the use of 2,000,000 times or more with a displacement amount of 0.4 mm.

Figure 4B:
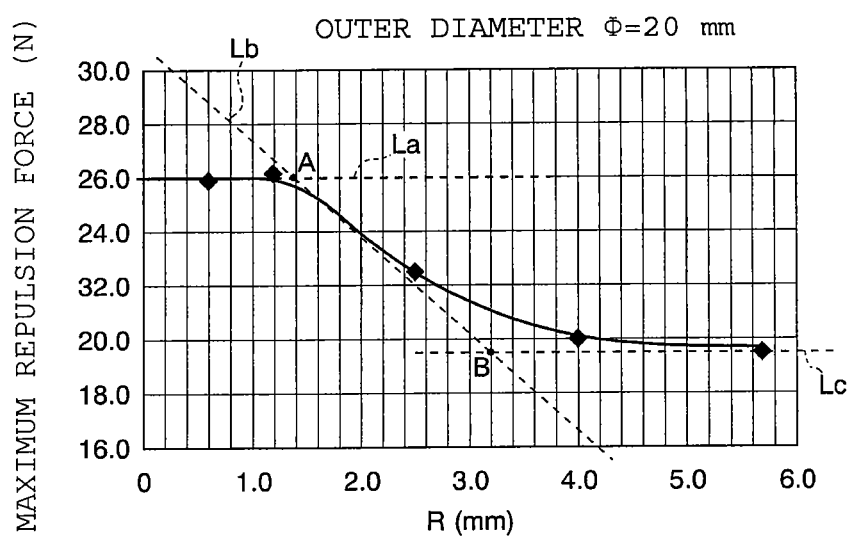
FIG. 4B is a graph illustrating a relationship between a radius of curvature R and a maximum repulsion force in a boundary portion of the diaphragm.

Further, FIG. 4B plots a relationship between a maximum value of the repulsion force (maximum repulsion force) in each diaphragm and the radius of curvature R of the boundary portion from the results illustrated in FIG. 4A. From the results, in the diaphragm having an outer diameter Φ of 20 mm, the maximum repulsion force is not changed in the vicinity of a radius of curvature R of 0.6 to 1.2 mm. However, in the vicinity of a radius of curvature R of 1.2 to 4.0 mm, the maximum repulsion force becomes smaller as the radius of curvature R increases. Further, when the radius of curvature R is equal to or more than 4.0 mm, the effect of reducing the maximum repulsion force, i.e., the stress is high. However, no substantial difference is found in the effect even if the radius of curvature R is increased. Therefore, in order to estimate a numerical value range of the radius of curvature R capable of reducing the maximum repulsion force (stress) at an outer diameter Φ of 20 mm, auxiliary lines La, Lb, and Lc were extrapolated as represented by broken lines of FIG. 4B, and an upper limit value ($R_0$ value) of the radius of curvature R and an $R_1$ value thereof were obtained with an intersection point A of the auxiliary lines La and Lb being a lower limit value ($R_0$ value) of the radius of curvature R having a stress reducing effect and an intersection point B of the auxiliary lines Lb and Lc being a value ($R_1$ value) of the radius of curvature R at which a high stress reducing effect was obtained. As a result, the lower limit value ($R_0$ value) of the radius of curvature R at the outer diameter $\Phi$ of 20 mm was 1.4 mm and the $R_1$ value was 3.1 mm.

Example 2

Figure 5A:
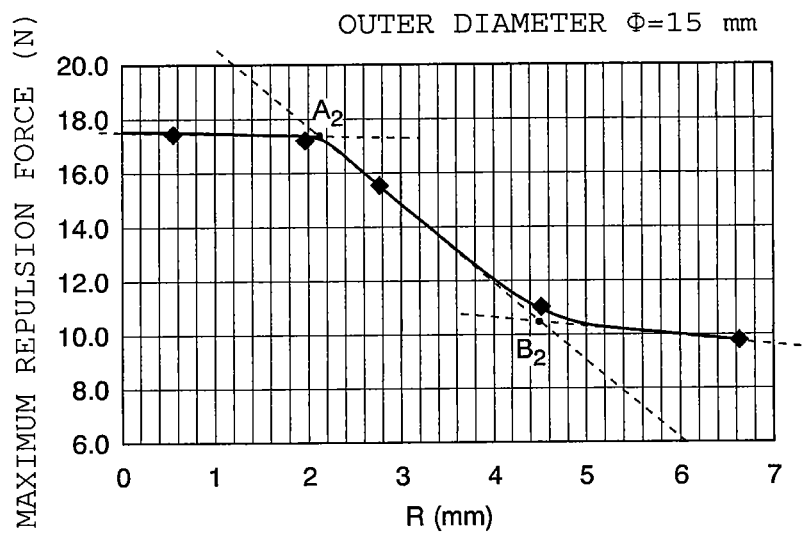
FIG. 5A is a graph illustrating a relationship between a radius of curvature R and a maximum repulsion force in a diaphragm having an outer diameter of 15 mm.

A plurality of diaphragms having an outer diameter $\Phi$ of 15 mm, a thickness of 0.1 mm, a height H of 0.50 mm, and a width t of a flange portion of 1 mm, with a radius of curvature R being set to 0.5 to 6.7 mm, were manufactured in the same way as in Example 1. For each of the obtained diaphragms having an outer diameter $\Phi$ of 15 mm, a relationship between the maximum repulsion force and the radius of curvature R was obtained in the same way as in Example 1, except for changing the outer diameter of the stem to 6 mm. FIG. 5A shows the results.

As illustrated in FIG. 5A, even in the diaphragm having the outer diameter $\Phi$ of 15 mm, the maximum repulsion force was reduced as the radius of curvature R was increased. The upper limit value ($R_0$ value) of the radius of curvature R at which a repulsion force (stress) applied to the diaphragm can be reduced effectively, and the value ($R_1$ value) of the radius of curvature R at which a high stress reducing effect is obtained were obtained in the same way as in Example 1. A lower limit value ($R_0$ value) $A_2$ of the radius of curvature R at the outer diameter $\Phi$ of 15 mm was 2.1 mm, and an $R_1$ value $B_2$ was 4.6 mm.

Example 3

Figure 5B:
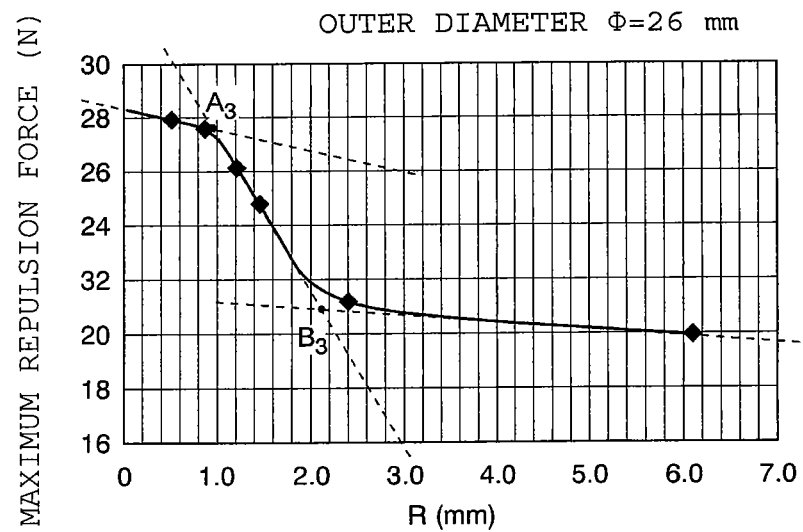
FIG. 5B is a graph illustrating a relationship between a radius of curvature R and a maximum repulsion force in a diaphragm having an outer diameter of 26 mm.

A plurality of diaphragms having an outer diameter $\Phi$ of 26 mm, a thickness of 0.1 mm, a height H of 0.95 mm, and a width t of a flange portion of 1 mm, with a radius of curvature R being set to 0.5 to 6.1 mm, were manufactured in the same way as in Example 1. For each of the obtained diaphragms having an outer diameter $\Phi$ of 26 mm, a relationship between the maximum repulsion force and the radius of curvature R was obtained in the same way as in Example 1, except for changing the outer diameter of the stem to 10 mm. FIG. 5B shows the results.

As illustrated in FIG. 5B, even in the diaphragm having the outer diameter $\Phi$ of 26 mm, the maximum repulsion force was reduced as the radius of curvature R was increased. The upper limit value ($R_0$ value) of the radius of curvature R at which a repulsion force (stress) applied to the diaphragm can be reduced effectively, and the value ($R_1$ value) of the radius of curvature R at which a high stress reducing effect is obtained were obtained in the same way as in Example 1. A lower limit value ($R_0$ value) $A_3$ of the radius of curvature R at the outer diameter $\Phi$ of 26 mm was 1.0 mm, and an $R_1$ value $B_3$ was 2.1 mm.

Figure 6A:
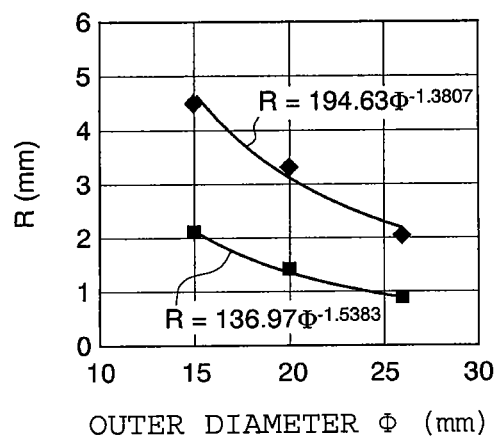
FIG. 6A is a graph obtained by plotting a relationship between an outer diameter Φ in a range of 15 to 26 mm, and a lower limit value ($R_0$ value) of a radius of curvature R at which a stress reducing effect is obtained and a value ($R_1$ value) of a radius of curvature R at which a high stress reducing effect is obtained.

The lower limit value ($R_0$ value) of the radius of curvature R at which a stress reducing effect at the outer diameter $\Phi$ is obtained and the value ($R_1$ value) of the radius of curvature R at which a high stress reducing effect is obtained, obtained in Examples 1 to 3, were summarized in Table 1. Further, a relationship between the lower limit value ($R_0$ value) of the radius of curvature R at which a stress reducing effect is obtained and the outer diameter $\Phi$, and a relationship between the value ($R_1$ value) of the radius of curvature R at which a high stress reducing effect is obtained and the outer diameter $\Phi$ were plotted (FIG. 6A) to obtain approximation expressions (relational expressions). The obtained relational expressions are shown in Table 2 and FIG. 6A.

TABLE 2

| | Outer diameter $\Phi$ (mm) | | | Relational expression |
|---|---|---|---|---|
| | 15 | 20 | 26 | of R and $\Phi$ |
| Lower limit value ($R_0$ value) of radius of curvature R at which stress reducing effect is obtained (mm) | 2.1 | 1.4 | 1.0 | $R = 136.97\Phi^{-1.5383}$ |
| Value ($R_1$ value) of radius of curvature R at which high stress reducing effect is obtained (mm) | 4.6 | 3.1 | 2.1 | $R = 194.63\Phi^{-1.3807}$ |

Figure 6B:
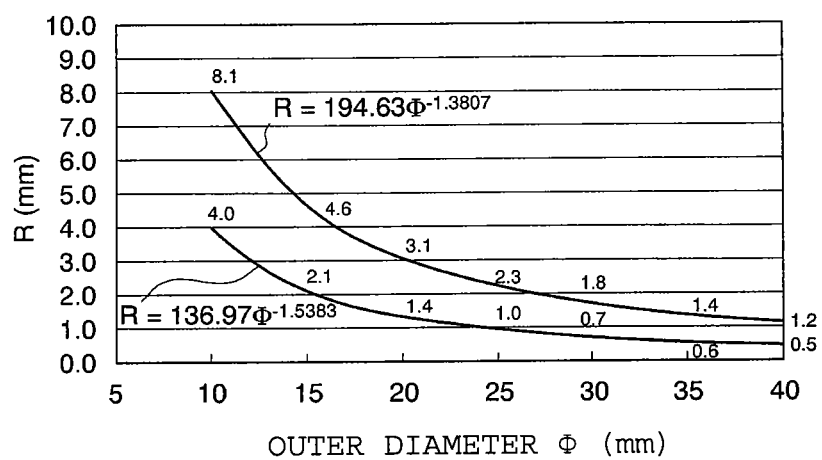
FIG. 6B is a graph obtained by plotting a relationship between an outer diameter Φ in a range of 10 to 40 mm, and a lower limit value ($R_0$ value) of a radius of curvature R at which a stress reducing effect is obtained and a value ($R_1$ value) of a radius of curvature R at which a high stress reducing effect is obtained.

Next, from the obtained relational expressions, the lower limit value ($R_0$ value) of the radius of curvature R at which a stress reducing effect is obtained and the value ($R_1$ value) of the radius of curvature R at which a high stress reducing effect is obtained, at an outer diameter $\Phi$ of 10 to 40 mm, were plotted (FIG. 6B).

As illustrated in FIG. 6B, in the diaphragm having an outer diameter $\Phi$ of 10 to 35 mm according to the present invention, a repulsion force (i.e., stress) applied to the diaphragm can be reduced by setting the radius of curvature R in accordance with the size of the outer diameter $\Phi$ so as to satisfy a relationship of $R \geq 2136.97\Phi^{-1.5383}$. Thus, it is apparent that, even in the case of setting a Cv value to be large by increasing a displacement amount of the diaphragm, a diaphragm and a diaphragm valve having high long-term durability can be obtained.

Further, by setting the radius of curvature R to be equal to or more than the value ($R_1$ value) of the radius of curvature R at which a high stress reducing effect is obtained as illustrated in FIG. 6B, a high stress reducing effect can be obtained irrespective of the displacement amount of the diaphragm. More specifically, in the diaphragm having the outer diameter $\Phi$ of 10 to 35 mm according to the present invention, by setting the radius of curvature R in accordance with the size of the outer diameter $\Phi$ so as to satisfy a relationship of $R \geq 194.63\Phi^{-1.3807}$, a repulsion force (i.e., stress) applied to the diaphragm can be reduced still more effectively. Thus, it is apparent that, even in the case of setting a Cv value to be large by increasing a displacement amount of the diaphragm, a diaphragm and a diaphragm valve having high long-term durability can be obtained.

Further, as illustrated in FIG. 6B, by setting the radius of curvature R to be about 8.1 mm, the diaphragm having an outer diameter $\Phi$ of 10 to 35 mm according to the present invention can exhibit a high stress reducing effect irrespective of the size of the outer diameter $\Phi$ and the displacement amount of the diaphragm. It is apparent that, even in the case of setting a Cv value to be large by increasing a displacement amount of the diaphragm, a diaphragm and a diaphragm valve having high long-term durability can be obtained.

Further, a plurality of diaphragms having different outer diameters $\Phi$ and radii of curvature R were manufactured in the same way as in Examples 1 to 3, except for using an alloy having a composition of Co:38.8%, Ni:16.5%, Cr:12.0%, W:4.07%, Mo:4.03%, Si:0.9%, Mn:0.69%, Ti:0.64%, Al:0.11%, and C:0.002% in terms of mass ratio, with the remaining portion being formed of Fe and inevitable impurities, and a relationship between a maximum repulsion force and a radius of curvature R was obtained. Then, in the same way as in Examples 1 to 3, a relationship between the lower limit value ($R_0$ value) of the radius of curvature R and the outer diameter $\Phi$, and a relationship between the value ($R_1$ value) of the radius of curvature R at which a high stress reducing effect is obtained and the outer diameter $\Phi$ were plotted to obtain approximation expressions (relational expressions). As a result, the relational expressions similar to those obtained in Examples 1 to 3 were obtained.

From this result, it was confirmed that, even in the diaphragm formed of a cobalt-based superalloy and having an outer diameter $\Phi$ of 10 to 35 mm according to the present invention, by setting the radius of curvature R in accordance with the size of the outer diameter $\Phi$ so as to satisfy the relationship of $R \geq 136.97\Phi^{-1.5383}$, a repulsion force (stress) applied to the diaphragm can be reduced. Further, it was confirmed that, by setting the radius of curvature R in accordance with the size of the outer diameter $\Phi$ so as to satisfy the relationship of $R \geq 194.63\Phi^{-1.3807}$, the repulsion force (stress) applied to the diaphragm can be reduced still more effectively. Further, it was confirmed that, by setting the radius of curvature R to be about 8.1 mm, a high stress reducing effect can be obtained irrespective of the size of the outer diameter $\Phi$ and the displacement amount of the diaphragm.

Thus, according to the diaphragm of the present invention, it is apparent that, even in the case of setting a Cv value to be large by increasing a displacement amount of the diaphragm, a diaphragm and a diaphragm valve having high long-term durability can be obtained.

What is claimed is:

1. A diaphragm having an outer diameter $\Phi$ of 10 to 35 mm and comprising a dome portion in a dome shape and a flange portion formed continuously at a peripheral edge of the dome portion via a boundary portion,
   wherein the boundary portion has a radius of curvature R of 0.6 mm or more on a convex side of the dome portion, and
   wherein the diaphragm is formed of a cobalt-based superalloy having a composition range of 30 to 45% of cobalt, 10 to 20% of nickel, 5 to 20% of chromium, 3 to 5% of tungsten, 3 to 9% of molybdenum, and 1 to 40% of iron in terms of mass ratio.

2. A diaphragm valve comprising the diaphragm according to claim 1.

3. A diaphragm according to claim 1, wherein the outer diameter $\Phi$ and the radius of curvature R satisfy a relationship of $R \geq 136.97\Phi^{-1.5383}$.

4. A diaphragm valve comprising the diaphragm according to claim 3.

5. A diaphragm having an outer diameter $\Phi$ of 10 to 35 mm and comprising a dome portion in a dome shape and a flange portion formed continuously at a peripheral edge of the dome portion via a boundary portion,
   wherein the boundary portion has a radius of curvature R of 0.6 mm or more on a convex side of the dome portion, and
   wherein the diaphragm is formed of a nickel-based superalloy having a composition range of 25 to 45% of cobalt, 12 to 25% of chromium, 8 to 15% of molybdenum, 0.1 to 3% of niobium, and 12 to 54.9% of nickel in terms of mass ratio.

6. A diaphragm according to claim 5, wherein the outer diameter $\Phi$ and the radius of curvature R satisfy a relationship of $R \geq 136.97\Phi^{-1.5383}$.

7. A diaphragm valve comprising the diaphragm according to claim 5.

8. A method of manufacturing a diaphragm having an outer diameter $\Phi$ of 10 to 35 mm and comprising a dome portion in a dome shape and a flange portion formed continuously at a peripheral edge of the dome portion via a boundary portion, the boundary portion having a radius of curvature R of 0.6 mm or more on a convex side of the dome portion, the method comprising
   die-cutting to a disk shape and then molding in a dome shape a cobalt-based superalloy having a composition range of 30 to 45% of cobalt, 10 to 20% of nickel, 5 to 20% of chromium, 3 to 5% of tungsten, 3 to 9% of molybdenum, and 1 to 40% of iron in terms of mass ratio.

9. A method of manufacturing a diaphragm according to claim 8, wherein the outer diameter $\Phi$ and the radius of curvature R satisfy a relationship of $R \geq 136.97\Phi^{-1.5383}$.

10. A method of manufacturing a diaphragm having an outer diameter $\Phi$ of 10 to 35 mm and comprising a dome portion in a dome shape and a flange portion formed continuously at a peripheral edge of the dome portion via a boundary portion, the boundary portion having a radius of curvature R of 0.6 mm or more on a convex side of the dome portion,
    the method comprising die-cutting to a disk shape and then molding in a dome shape a nickel-based superalloy having a composition range of 25 to 45% of cobalt, 12 to 25% of chromium, 8 to 15% of molybdenum, 0.1 to 3% of niobium, and 12 to 54.9% of nickel in terms of mass ratio.

11. A method of manufacturing a diaphragm according to claim 10, wherein the outer diameter $\Phi$ and the radius of curvature R satisfy a relationship of $R \geq 136.97\Phi^{-1.5383}$.

* * * * *